March 23, 1971

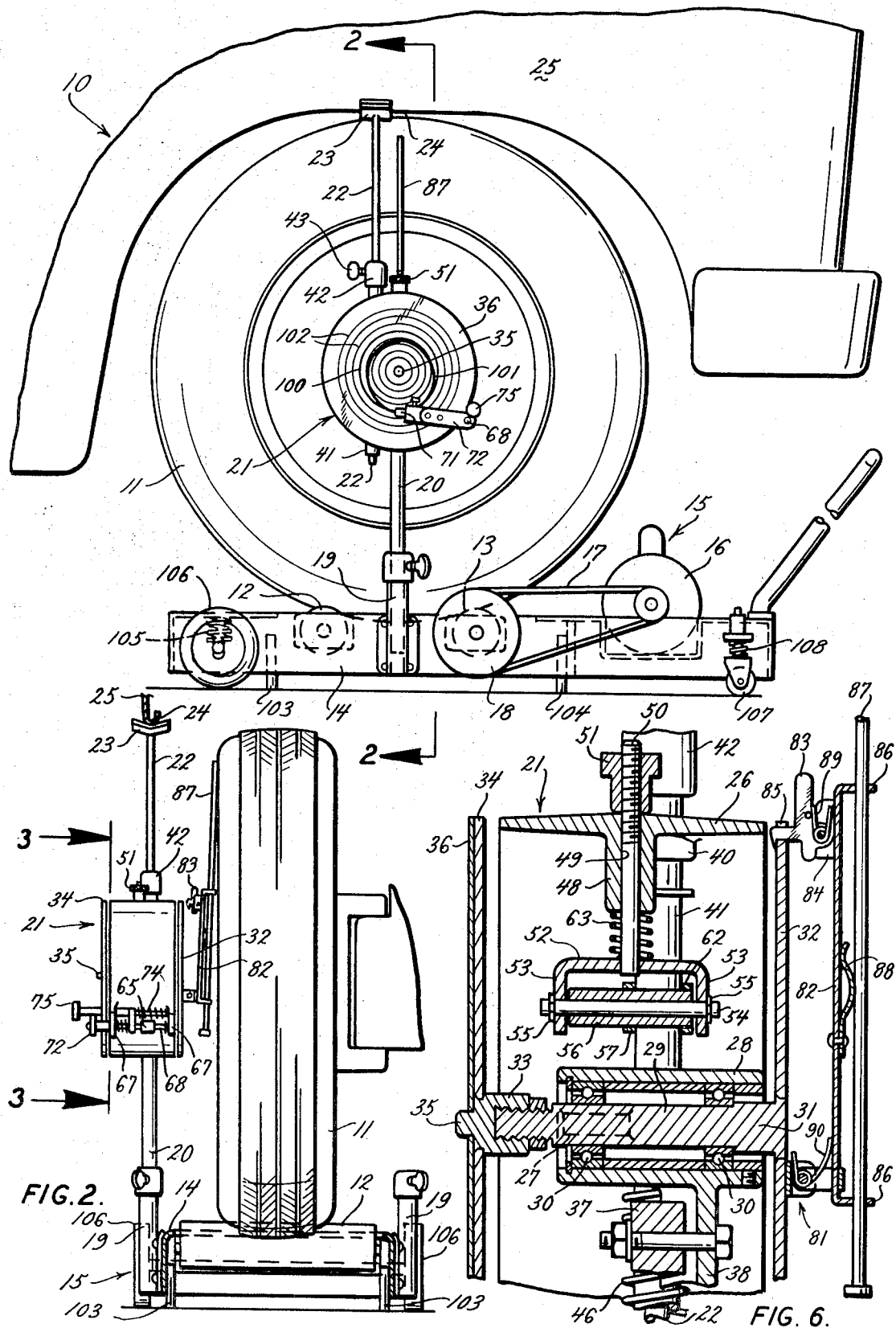

L. HUNTER 3,572,107

RADIAL TIRE FORCE INDICATOR APPARATUS

Filed Feb. 20, 1969

March 23, 1971 L. HUNTER 3,572,107
RADIAL TIRE FORCE INDICATOR APPARATUS
Filed Feb. 20, 1969 3 Sheets-Sheet 3
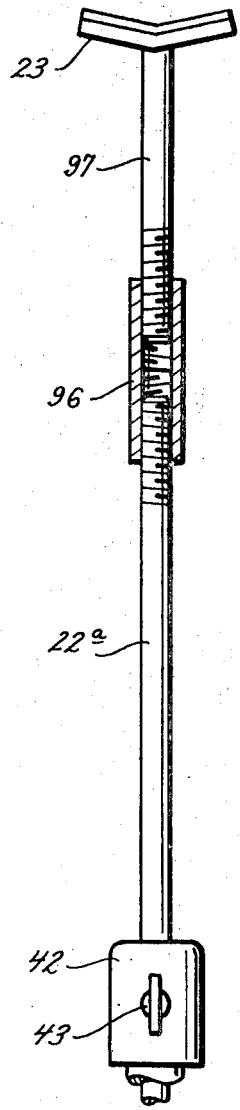
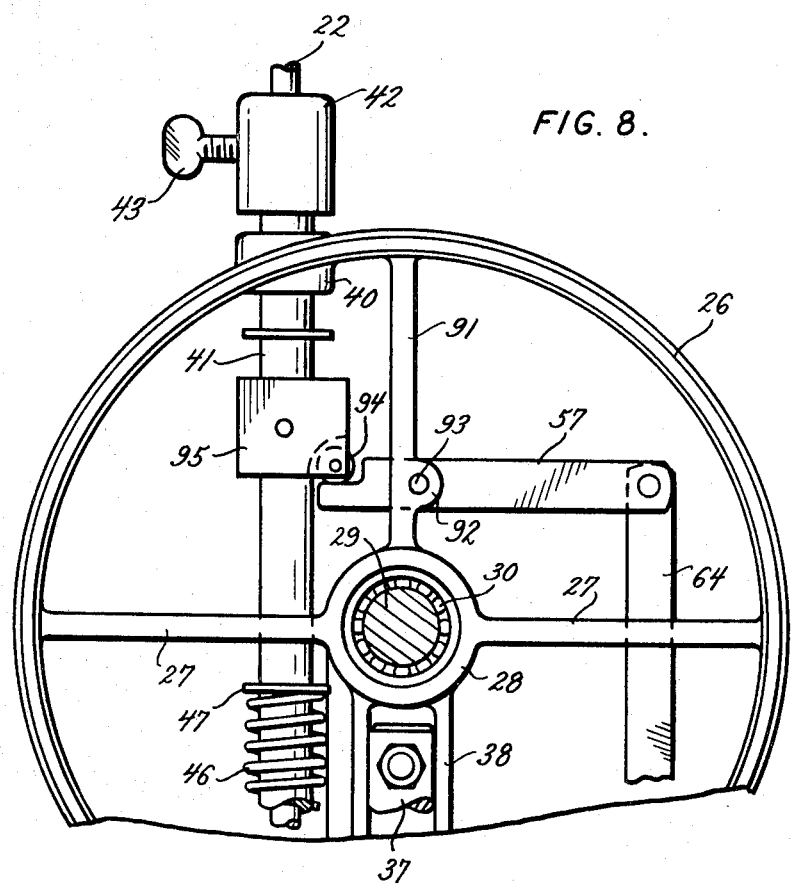

United States Patent Office 3,572,107
Patented Mar. 23, 1971

3,572,107
RADIAL TIRE FORCE INDICATOR APPARATUS
Lee Hunter, 13501 Ladue Road, Ladue, Mo. 63141
Filed Feb. 20, 1969, Ser. No. 800,869
Int. Cl. G01m 17/02
U.S. Cl. 73—146                                5 Claims

ABSTRACT OF THE DISCLOSURE

Apparatus for indicating the vehicle supporting strength characteristics of a tire which carries the weight of the vehicle adjacent thereto, and for locating the inequalities or weak areas in the tire construction. The apparatus includes means to engage and turn the vehicle tire at a low speed so as not to introduce suspension system responses, means to monitor the vehicle motion resulting from variations in structural strength of the tire, and means associated with the monitoring means to display the tire strength and weaknesses throughout a complete revolution thereof and to compare such response to a theoretically uniform strength tire.

---

This invention pertains to indicator apparatus for locating vehicle vibration and road thumping disturbances attributable to characteristics inherent in tire construction which at normal road speeds may be attributed to wheel suspension mechanisms, body or frame vibrations, and other portions of a vehicle that might be adversely affected by tire reactions.

It is increasingly apparent that the vehicle wheel suspension systems of vehicles are sufficiently soft or responsive to wheel and tire rotation effects to transmit undesirable vibrations and other disturbances to the steering system so that drivers are conscious of the disturbances by steering wheel reactions. Repeated examinations of the suspension systems of vehicles experiencing the noted disturbances by conventional testing apparatus will not locate the problem. It is, of course, understood that at certain road speeds vehicles have critical vibration responses, so that until now nobody has suspected the problem to be associated with tire construction.

The present indicator means is intended to expand and refine the ability of vehicle service people to accurately locate the vibration problems by providing means for testing the vehicle tires while rotating with the load of the vehicle imposed thereon. Vibration problems due to inequalities in the construction of tires can be located by the present indicator means and as a result faulty tires can be located and removed from the steerable wheels with a consequent improvement in the handling characteristics of the vehicle. Lack of uniformity in tire construction may arise by reason of faulty laying up of the carcass plies, excessive ply overlap, variations in thread thickness, lack of uniform density of the carcass and tread materials, and other inequalities. All of these characteristics have an effect upon the strength of a tire when under load conditions so that during rotation a tire may have more yield or give in some spots than in others. As a consequence the vehicle when running is caused to rise and fall or have an undulating motion which is superimposed on the normal responses to road surface conditions. It is this undulating motion that causes the disturbances which are transmitted to the driver's feel at the steering wheel, and such motion is accentuated as vehicle speeds are increased.

An important object of this invention is to provide an indicator which will accurately determine the presence of inequalities in the strength of vehicle tires and indicate the location of weak spots by responding to the forces applied radially on the tires by the weight of the vehicle.

It is another object of this invention to provide indicator means for testing vehicle tires under normal vehicle loads to locate tires which may be causing vibration problems of the character indicated.

It is also an object of this invention to provide indicator means of simple construction and reliability for the purpose of locating faulty tires and generally thereby improving the operation and safety of vehicles.

A preferred embodiment of the radial tire force indicator includes a wheel spinning unit which supports the vehicle wheel by its tread and rotates the same at a low speed so that vehicle suspension mechanisms and shock absorber responses are not excited to the state where they contribute to the vibrations that come directly from the tires. The spinning unit carries an indicator head that is provided with a feeler responsive to vehicle body motion and a pick-off unit for translating the vehicle motion into either a line trace on a chart or an electrical indication for visually showing the signals produced by tire force effect on the vehicle body.

Modifications of the preferred embodiment are hereinafter shown in the drawings and described in sufficient detail to enable those having skill in this art to fully understand the same.

FIG. 1 is a fragmentary elevational view of the right front portion of a vehicle showing the present tire force indicator apparatus positional in operating position at the front wheel;

FIG. 2 is a fragmentary view of the apparatus taken at line 2—2 in FIG. 1;

FIG. 6 is a fragmentary sectional elevational view taken at line 6—6 in FIG. 3;

FIG. 7 is a fragmentary view of a modified feeler rod for the apparatus of FIG. 1; and FIG. 8 is a fragmentary sectional view similar to FIG. 3 but illustrating a modification in the assembly of the components.

Figure 3:
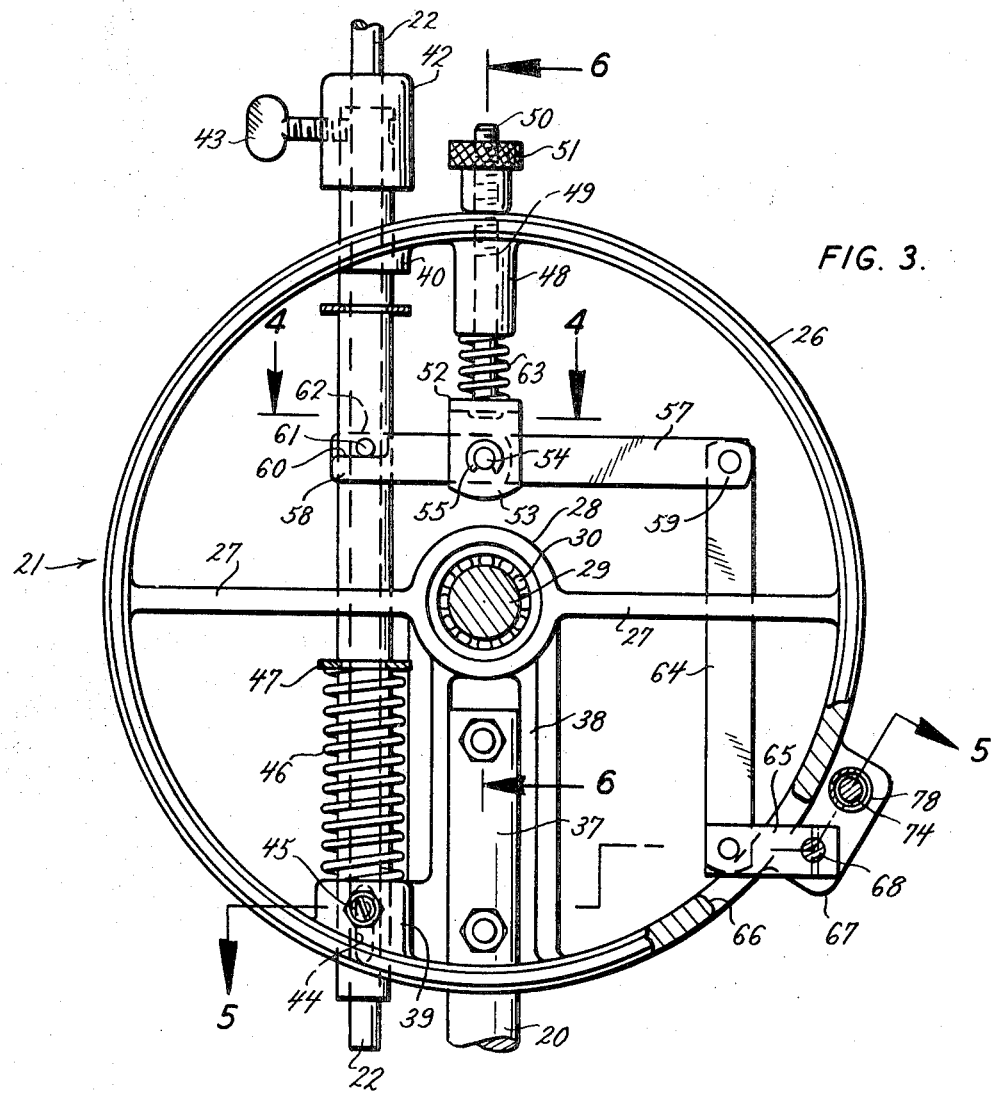
FIG. 3 is an enlarged front elevational view of the indicator head and the responsive mechanism operatively mounted therein, all as seen at line 3—3 in FIG. 2.

In FIGS. 1 and 2 the vehicle 10 is shown with its right front tire 11 supported on the cradle rollers 12 and 13 operatively mounted in the frame 14 of a wheel spinning unit 15. The vehicle front end is elevated by a conventional jack (not shown) so that the unit 15 can be positioned under the tire 11. The opposite or left front wheel is also elevated a like distance so the vehicle is essentially level so the tire 11 will rotate naturally on the cradle rollers 12 and 13. An electric motor 16 is connected by belt 17 to a pulley 18 on the shaft of the roller 13 to drive the roller at a low speed such that the suspension mechanism and shock absorber are not caused to interfere with the examination of the tire 11. The spinner unit 15 is provided at each side of its frame 14 with a socket 19 for the right and left mounting of a post 20 which supports an indicator head 21 assembly. The head 21 is provided (in a manner to be described presently) with a vehicle motion receiving in the nature of a feeler rod 22 having a pad 23 at its upper end portion to engage the lip 24 of the vehicle fender 25 and to thereby receive for susbequent transmission the vertical motion of the vehicle fender and frame caused by the variations in radial strength of the tire supporting the vehicle during tire rotation.

It is pointed out that tires have the first duty to carry the weight of the vehicle and a perfectly constructed tire will exert a uniform support at every point around its circumference. If a tire is so constructed it will when rotated at low speed support the vehicle without any rise or fall in the fender 25 relative to its distance from the cradle rollers 12 and 13. A tire having some construction fault, on the other hand, will upon rotation under vehicle loading allow the fender 25 to move down when a soft or less strong portion reaches the cradle rollers 12 and 13. As the soft spot passes the rollers and a strong spot reaches the roller, the fender will rise again. Thus, an undulating vertical movement is visible at the fender 25. The presence of this tire condition and the amount of motion reaction of the fender is detected by the present apparatus.

The construction and assembly of the indicator head 21 will be described with reference to FIGS. 2 through 6 as follows. The head assembly 21 includes a cylindrical housing 26 having a horizontal web 27 formed with a bearing boss 28 to receive a shaft 29 in suitable bearing 30. An enlarged head 31 on the shaft carries a rotating disc 32 which enclose the side of housing 26 nearest the tire 11. The opposite end of the shaft 29 is threaded to receive a hub 33 on which a second disc 34 is mounted to enclose the adjacent side of housing 26. The hub 33 is formed with a projecting center pin 35 to receive a chart or paper disc 36 on which the vehicle motion is scribed as will be pointed out.

Figure 5:
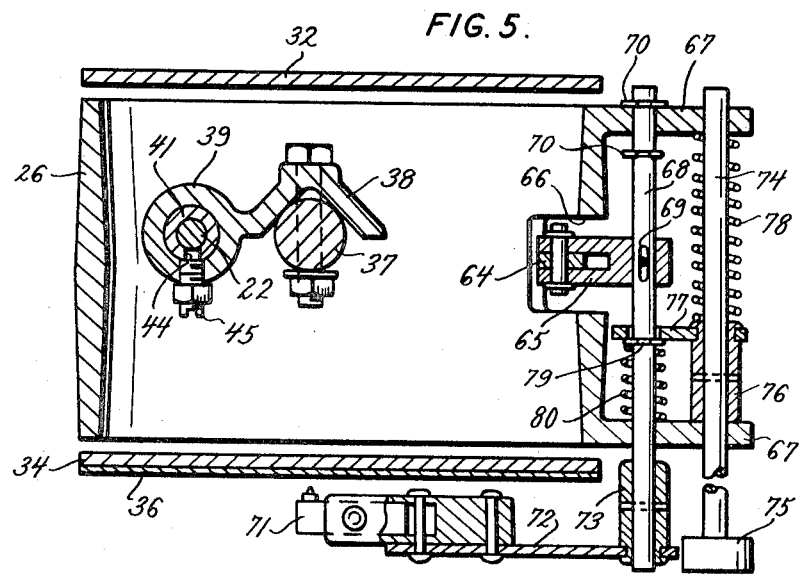
FIG. 5 is a further fragmentary sectional view of the operating mechanism seen at line 5—5 in FIG. 3.

The post 20 heretofore noted in FIGS. 1 and 2 has its upper end 37 secured (FIGS. 3 and 5) in a V-shaped web 38 cast integrally with housing 26. A pair of apertured bosses 39 and 40 are formed in the housing in axial vertical alignment at one side of the post 20, and an elongated sleeve 41 extends through these bosses 39 and 40 to project outwardly of the housing body 26 at the bottom and top thereof. The upper end of the sleeve 41 carries a cap member 42 in which a set screw 43 is mounted to adjustably fix the position of the feeler rod 22 which telescopes in the sleeve. The feeler rod 22 thus may be extended or retracted vertically to suit the condition of having the pad 23 abut the fender lip 24 of the vehicle. Once such adjustment is made the rod 22 moves with the sleeve 41 within the limits of a slot 44 formed in the bottom boss 39 (FIGS. 3 and 5). A motion limiting stop screw 45 is passed through the slot 44 and engages the sleeve 41.

The sleeve 41 is pressed upwardly to the top limit of slot 44 by a compression spring 46 which abuts at one end on boss 39 and at its upper end a stop element 47 snap-fitted about the sleeve 41. The downward motion of the vehicle fender 25 on the feeler rod pad 23 compresses spring 46 to produce the down motion of the sleeve 41 and rod 22, and the spring 46 causes the pad 23 to follow the fender in its upward motion.

A further housing boss 48 (FIGS. 3 and 6) is provided in axial alignment with the post 20 to carry an adjusting rod 49 on the outer end 50 of which is threadedly mounted an adjusting knob 51. The lower inner end of the adjusting rod 49 carries a yoke 52 (FIGS. 3, 4 and 6) having spaced down-turned portions 53 in which is mounted a pivot shaft 54. The shaft is secured by suitable keepers 55 at its opposite ends. The pivot shaft carries a spacer sleeve 56 on which a lever arm 57 is fastened at a point between its opposite ends 58 and 59. The end 58 is notched to provide a flat 60 (FIGS. 3 and 4) for abutment by a pin 61 which is fixed in the sleeve 41. The spacer 56 also carries a stabilizer arm 62 which extends parallel to the lever arm 57 and abuts the side of the sleeve 41 so that the yoke 52 is prevented from rotating during turning of the adjusting knob 51.

Figure 4:
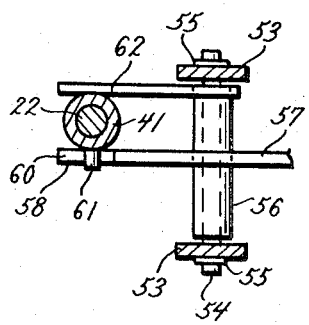
FIG. 4 is a fragmentary sectional view of a portion of the mechanism in the indicator head as seen at line 4—4 in FIG. 3.

It can be understood from FIGS. 3 and 4 that the knob 51 is useful to raise or lower the position of the pivot shaft 51, and a spring 63 is mounted between the yoke 52 and the end of the boss 48. Thus, the yoke 52 is always tensioned to prevent vertical movement by taking up slack in the threaded connection between the knob 51 and the threads at the rod end 50. The knob 51 has the function of setting the initial position of the lever arm 57, as will appear.

The long end 59 of lever arm 57 is pinned to the upper end of a link 64 (FIGS. 3 and 5), and the lower end of the link 64 is pinned to a clevis link 65 which has its opposite end projecting through an aperture 66 in the wall of housing 26. The housing 26 is formed adjacent the aperture 66 with spaced ears 67 to support a carrier shaft 68 which is pinned to the clevis 65 at an axially directed slot 69 in the shaft 68. The carrier shaft 68 is slidably and pivotally mounted in the ears 67 and is secured by spaced keeper elements 70 for limited axial or sliding movement. The rotation of the carrier shaft is effected by the clevis 65 through the link 64 and lever arm 57 whereby it is caused to move with the rise and fall of the feeler rod 22. The arrangement of arm 57 and clevis 65 greatly magnifies the rotation of the carrier shaft relative to the rod 22 so that movement of the vehicle fender lip 24 can be easily detected by a predetermined magnification factor.

As is seen in FIGS. 2 and 5, the end portion of carrier rod 68 adjacent the disc 34 on which the chart 36 is mounted carries a motion indicating means in the nature of marking pen 71 on arm 72 fast on the rod 68 at the sleeve 73. Means to control the marking pen 71 comprises a push-pull shaft 74 having a knob 75 at its outer end. The shaft 74 is slidably mounted in the housing ears 67 parallel to the carrier shaft 68. A sleeve 76 is pinned to the shaft 74 so as to support a finger 77 in position to receive the carrier shaft 68 therein. A compression spring 78 abutting one ear 67 and the end of the sleeve 76 maintains the push-pull shaft 74 in an extended position relative to the plane of the chart disc 34. This action of spring 78 causes the finger 77 to engage a snap washer 79 on the carrier shaft and pull the latter shaft 68 outwardly against the lighter force of a second compression spring 80 captured between the front ear 67 and the snap washer 79. Thus, the vehicle motion indicating means or marking pen 71 is held off the chart 36 until the knob 75 is pushed inwardly against its spring 78, whereupon the lighter spring 80 moves the pen 71 into contact with the chart 36.

Rotation of the chart 36 with its disc 34 is effected through the shaft 29 (FIGS. 2 and 6). As shown, a suitable hinge assembly 81 is mounted on the disc 32 below the axis of shaft 29 and a mounting yoke 82 is secured to the hinge 81 so as to extend diametrically across the disc 32 where a snap hook 83 is pivotally mounted in a bracket 84 on the yoke 82. The hook 83 engages in a marginal slot 85 in the disc 32. The yoke 82 has outturned ears 86 at its ends, and these ears 86 are apertured to receive a drive rod 87. The rod 87 may be axially adjusted through the ears 86 to extend to a position where the rod will engage the side wall of tire 11 (FIG. 1). A friction spring 88 in the yoke 82 maintains the drive rod in whatever position of extension is desired. The drive rod 87 has its opposite ends enlarged so that it cannot fall out of the yoke. When not in use the drive rod is held by the snap hook 83 adjacent the disc 32, and a spring 89 maintains the hook engaged in the disc slot 85. The hinge assembly 81 is provided with a suitable spring 90 to press the drive rod 87 against the tire side wall so that sufficient pressure is exerted to cause the rod to orbit with the rotation of the tire 11 and, thus, rotate the disc 32. In turn, rotation of the disc 32 rotates the shaft 29 and this rotates the chart 36 with disc 34.

In FIGS. 7 and 8 certain modifications are shown which may be substituted for portions of the assembly shown and described in FIGS. 1 and 3. When adopted the assembly of FIGS. 1 and 3 will be altered to do away with the adjusting rod 49, the knob 51, and the yoke 52, together with the stabilizing finger 62. The modified assembly includes the provision of a vertical web 91 in the housing body 26 in place of the boss 48. The web 91 has a bearing boss 92 thereon to support a pivot 93 on which the lever arm 57 is mounted. The notch 60 in the short arm 58 of the lever arm 57 engages a roller 94 pivotally mounted in a follower block 95 which is fastened to the sleeve 41. Thus, vertical movement of the sleeve 41 will cause the roller 94 to move the lever arm 57 in a counterclockwise direction about pivot 93, and the weight of the pen 71 and the linkages associated with it will cause the lever arm 57 to want to move in the clockwise direction so as to follow the roller 94.

The adjustment in the initial setting of the pen 71 is achieved, in the modified view of FIG. 7, by a turnbuckle member 96 operatively connecting the upper end of the feeler rod 22A with a post 97 on the pad 23. The rod 22A and post 97 are provided with opposite hand threads whereby turning of the member 96 will lengthen or shorten the effective length of the feeler rod 22A and thus has the effect of changing the starting position of the pen 71 on the chart.

The present apparatus of FIGS. 1 or 8 is initially mounted as shown in FIG. 1. The weight of the vehicle 10 on the rollers 12 and 13 causes the frame 14 to settle down on a pair of pins 103 (FIG. 2) by compressing the springs 105 which raise the frame on the wheels 106. The caster wheels 107 are also loaded by springs 108 and these springs likewise are compressed to allow the single pin 104 (FIG. 1) to engage the floor. The pins 103 and 104 prevent the frame 14 from moving while the wheel is in place, and the caster wheels 102 make the frame 14 maneuverable. The position of the head assembly 21 is selected so the shaft 29 therein will be close to the center of rotation of the tire 11 and so the drive rod 87 will be rotated substantially concentrically with the tire. Next the pad 23 is adjusted relative to the sleeve 41 so it just engages the vehicle fender lip 24. With these steps completed, the adjusting knob 51 of FIG. 3 is turned until the pen 71 has its point about on the base line 100 of the chart 36 (see FIG. 1). In the modified means of FIGS. 7 and 8, the pen 71 is adjusted merely by turning the turnbuckle member 96 in the required direction to swing the pen arm 72.

The apparatus is now set up so the tire may be rotated by motor 16 at the low velocity of the order of 5 miles per hour or less. This low velocity is needed to prevent unwanted influences from the wheel mounting assembly or the shock absorber, which responses could introduce false or misleading readings. The tire rotation is effected with the normal weight of the vehicle thereon so the tire side wall is called upon to sustain the normal load and will flex or resist flexing depending on the character of its construction. As the tire 11 rotates and the side wall reacts it will allow the fender 25 to undulate, more or less in a vertical direction. The pad 23 on feeler rod 22 or 22A is urged by spring 46 to follow the rise and to be pushed down by the fender lip 24. This motion received from the vehicle is transmitted by the lever arm 57 to the pen arm 72 and to the pen 71. The motion indicating or scribing pen 71 can be seen, due to the magnification factor of the lever arm and associated linkage, to move in an up and down undulating manner. A trace 101 can be scribed on the chart 36 by pushing the knob 75 to engage the chart surface. The relationship of the pen trace 101 to the base line 100 of the chart will reveal whether the tire 11 has minimal or excessive side wall flexing. The less side wall flexing there is, the more acceptable the tire. This apparatus will also detect hard or generally inflexible side walls when the pen trace 101 moves radially outside the base line 100. Tires in this latter category generally cause thumping problems, although a soft side wall can also cause thumping due to the presence of inconsistencies in the degree of softness. Based on initial polar alignment of the chart 36, the trace 101 will indicate where around the tire circumference the soft or hard zones are, and the amount of deviation from the base circle 100, as measured in terms of the circular grid lines 102, will be an indication of the radial yield or resistance to yield of the tire being examined.

What is claimed is:

1. Apparatus for indicating the vehicle supporting strength characteristics of a tire which carries the normal service weight of the vehicle adjacent thereto, said apparatus comprising: a head assembly positionable adjacent the outer face of the tire during tire slow speed rotation; vehicle motion receiving means operatively carried by said head assembly; motion indicating means operatively connected to said motion receiving means; and means operatively connected between said motion receiving means and the vehicle to feed into said receiving means vehicle motion responses caused during tire rotation under load, said motion indicating means including a tire strength display chart on said head assembly connected to rotate with the tire, and chart marking means operatively mounted on said head assembly to engage and mark said chart.

2. The apparatus of claim 1 in which said vehicle motion receiving means includes a feeler member engaged on the vehicle and leverage means connected thereto to mechanically magnify the vehicle motion in its movement of said marking means.

3. Apparatus for indicating the vehicle supporting strength characteristics of a tire when supporting the normal weight of the vehicle and rotating at slow speed, said apparatus comprising: a head assembly stationed adjacent the rotating tire, a shaft operably mounted in said head assembly, one end being rotated by the tire; a marking chart operatively rotated by said shaft; marking means carried by said head assembly adjacent said marking chart; and a system of mechanical levers carried by said head assembly and operatively connected between the vehicle and said marking means to transmit and magnify the vehicle response to changes in tire supporting strength about the tire periphery during rotation into said marking means, said marking means making a trace on said chart corresponding to the tire strength characteristics.

4. In an on-the-vehicle tire force indicating apparatus, the improvement for use with a vehicle mounted wheel and tire assembly, of means to support and rotate the wheel and tire assembly on the vehicle to cause the tire to respond to vehicle loading thereon and yield to the force of the loading; a tire force display chart; means mounting said chart substantially centered with the axis of rotation of said assembly and to rotate with said assembly; movable chart marking means operably mounted adjacent said chart; means operably connected to said marking means and responding to the yielding of the tire under its vehicle loading to magnify, at said marking means, vehicle response to yielding of the tire in said wheel and tire assembly; and means manually operable to engage said marking means with said display chart.

5. In an on-the-vehicle tire force indicating apparatus for displaying the vehicle supporting strength characteristics of an on-the-vehicle mounted tire and wheel assembly having a suspension system to carry the normal service weight of the vehicle adjacent thereto, roller means operably supporting the vehicle tire and wheel assembly with its normal proportion of the vehicle service weight thereon, mounting means operably rotated by the tire and wheel assembly and being located substantially in the axis of wheel rotation, a tire force display chart carried by said mounting means, means operably connecting said wheel assembly to said chart for simultaneous rotation, power means operably connected to said roller means to rotate the wheel and tire assembly at a speed less than the speed at which the wheel suspension system responds to affect the tire response to normal vehicle service weight support, marking means adjacent said chart mounting means to scribe on said chart the yielding of the tire to the vehicle service weight during rotation of said tire and wheel assembly and said chart, and means operably carried by said chart mounting means and connected to said marking means to transmit vehicle motion thereto during rotation of the wheel and tire assembly.

References Cited

UNITED STATES PATENTS

| 2,695,520 | 11/1954 | Karasi | 73—146 |
| 2,914,940 | 12/1959 | Elliott et al. | 73—146 |
| 2,920,481 | 1/1960 | Hulswit, Jr. et al. | 73—146 |
| 3,060,733 | 10/1962 | Herzegh | 73—146 |
| 3,375,714 | 4/1968 | Bottasso | 73—146 |

LOUIS R. PRINCE, Primary Examiner

J. W. ROSKOS, Assistant Examiner